Patented May 16, 1933

1,909,386

UNITED STATES PATENT OFFICE

ALEXANDER J. WUERTZ, OF WILMINGTON, DELAWARE, ASSIGNOR TO E. I. DU PONT DE NEMOURS & COMPANY, OF WILMINGTON, DELAWARE, A CORPORATION OF DELAWARE

BENZANTHRONE-ACRIDINES AND PROCESS OF PREPARING THEM

No Drawing.   Application filed December 23, 1929.  Serial No. 416,214.

This invention relates to the synthesis of new derivatives of benzanthrone, and more particularly to a novel method of preparing derivatives of benzanthrone containing nuclear nitrogen, the application of said derivatives as water soluble dyestuffs on fibrous materials, such as wool, silk and leather.

In German Patents Nos. 407,838, 407,689 and 411,013 it is pointed out that benzanthrone under certain mild conditions of condensation undergoes a chemical reaction which results in the formation of 2:2'-dibenzanthronyl, to which the following formula has been assigned:

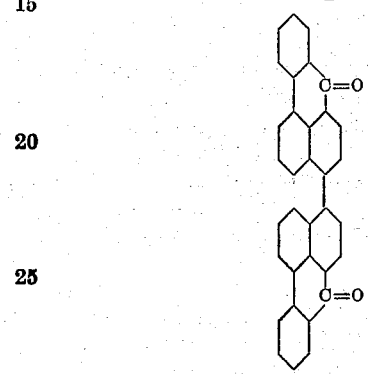

It is further pointed out that 2:2'-dibenzanthronyl, by subsequent fusion with potash, gives violanthrone, as follows:

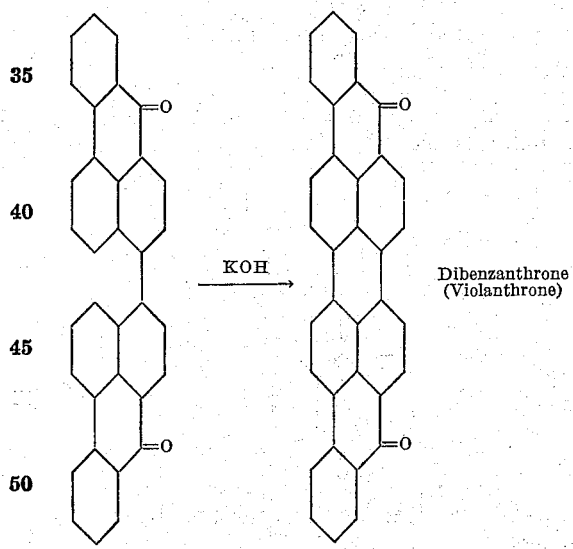

What is generally regarded as the unsymmetrical form of dibenzanthrone is the isometric form, isoviolanthrone (2-Bz-1:2'-Bz-1'-dibenzanthrone), formed either from Bz-1-chloro-benzanthrone or from the corresponding sulphur derivative resulting in 2-Bz-1'-dibenzanthronyl-sulphide. The reactions take place as follows:

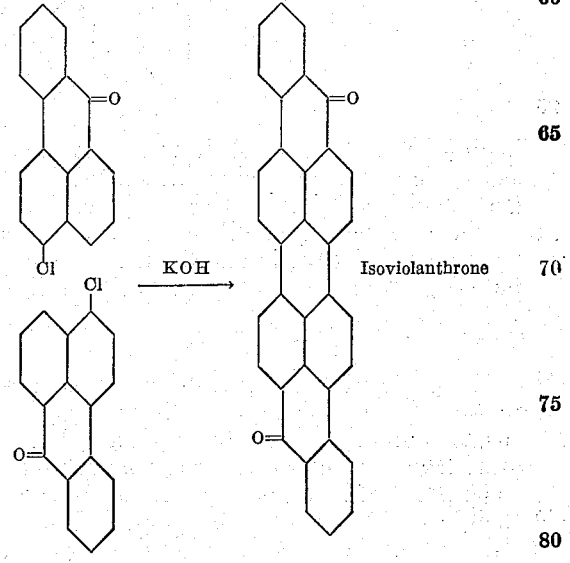

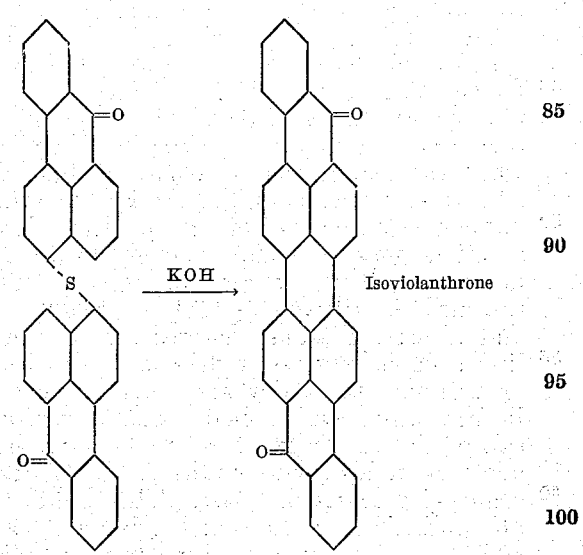

The reactions referred to above are not smooth and uniform since a number of by-products are formed which have more or less an indefinite constitution and which serve not only to render the process of producing the desired compounds less efficient, but also to produce dyes which are not as uniform as is desired.

My invention has for one of its objects the synthesis of new benzanthrone derivatives which are heterocyclic ring systems containing nuclear nitrogen. A further object of my invention is the conversion of said compounds to water soluble dyestuffs. Other objects will appear as this description proceeds.

These objects are accomplished by the following procedure, which in one of its broad aspects consists in fusing benzanthrone together with a primary base, such as aniline, in the presence of small amounts of nitrobenzene and a caustic alkali, such as caustic potash. Examples of my invention follow:

Example 1

100 parts of benzanthrone are suspended in 300 to 500 parts of aniline. To this suspension are added 150 to 200 parts of anhydrous, granular caustic potash and 25 to 50 parts of nitrobenzene. This mixture is then heated to 95–100° C. in a period of one-half to one hour under vigorous agitation. At this point a strong exothermic reaction ensues, the temperature rises of its own accord to 170–180° C. and the reaction mass is transformed to a crystalline form, the crystals having a metallic luster. Care should be taken not to apply any external heating when the main reaction ensues at 100° C. If excessive heat is applied the reaction will get out of the control of the operator. The reaction goes to completion in 15 to 20 minutes. When the reaction is completed the mass is allowed to cool to 75–100° C. and directly filtered; the residual crystalline cake is washed with small quantities of aniline, sucked dry and then suspended in hot water and boiled. The potassium salt of the new benzanthrone derivative hydrolyzes under these conditions to the free orange-red crystalline base. This is filtered off, washed alkali free, and dried at 100°–120° C. 100 parts of benzanthrone will yield 95 to 110 parts of the new derivative, the yield depending upon the temperature of the first filtration.

The product thus obtained may be further purified by a recrystallization from such solvents as acetic acid, the chlorobenzenes, nitrobenzene or aniline. From nitrobenzene and dichlorobenzene it crystallizes in long orange-red needles which have a melting point of 210.7–212.4° C. Its nitrogen content is 4.35% against 4.37% of the theoretical.

The probable structure of this new benzanthrone derivative may be deduced from its mode of formation and its chemical and physical properties. It is believed that it is formed as follows:

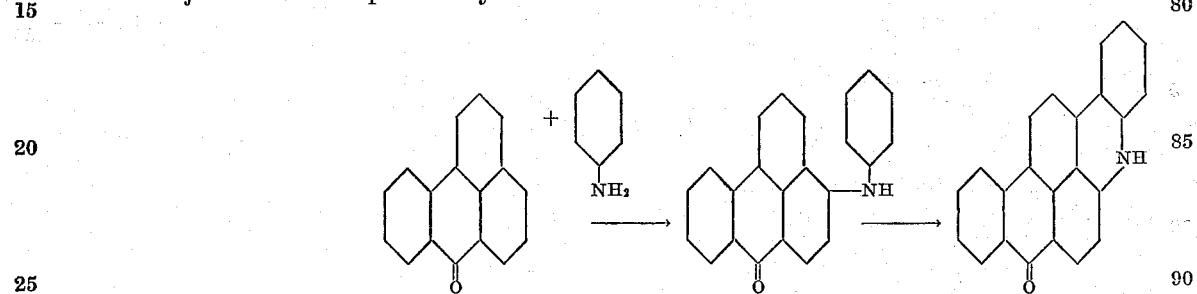

It is therefore 2-Bz-1-benzanthrone-hydroacridine.

Example 2

100 parts of benzanthrone are suspended in 400 parts of para-toluidine containing 25 to 50 parts of nitrobenzene. To this suspension are added 200 to 250 parts of powdered or flaked caustic potash and the whole heated to 95°–100° C. From here on the temperature is allowed to rise of its own accord to 170°–180° C. The reaction is usually completed in 20 minutes to one-half hour. The temperature is then allowed to fall to 100°–120° C. and the charge is diluted with 400 parts of solvent naphtha. The insoluble product is then filtered off, washed with solvent naphtha, sucked dry and the free base is isolated according to the procedure of Example 1. The product thus obtained is a red-brown powder having properties which in a general way compare with the properties of the product obtained in Example 1. This new compound has a probable constitution of:

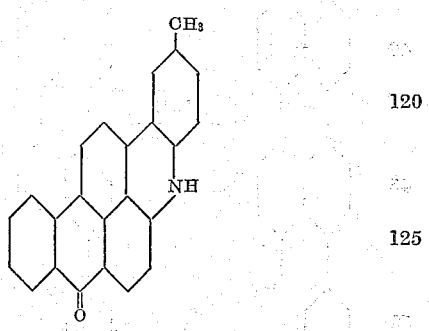

2-Bz-1-benzanthrone-para-methyl hydro-acridine.

Instead of using aniline and para-toluidine, ortho-toluidine may be used under similar conditions. The product obtained by the use of ortho-toluidine would have a correspondingly homologous structure as:

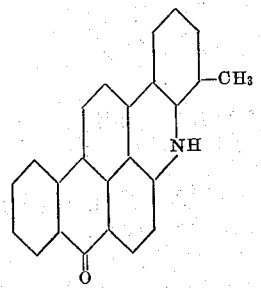

2-Bz-1-benzanthrone-3'-methyl-hydroacridine.

The products produced by the process described in the above examples do not dissolve in an alkaline hydrosulphite solution. They do dissolve in an alcoholic alkaline solution with a violet-red color. When dissolved in strong sulphuric acid they form soluble sulphates almost instantly. These soluble sulphates may be isolated in crystalline form by slow dilution with water and in this soluble form they are excellent dyestuff for wool and silk, as well as leather. They are also suitable for printing on wool and silk.

In the reaction by which these new compounds are formed the amine, such as aniline, enters into a reaction with the benzanthrone to form a basic heterocyclic compound, the reaction apparently being furthered by the dissociation of nitrobenzene. The principle involved is based upon the reactivity of the benzanthrone molecule in which, presumably, the 2- and Bz-1- positions take part. The presence of the nitrobenzene or a similar nitrocompound prevents the formation of 2:2'-dibenzanthronyl and therefore hinders the formation of violanthrone. The reaction, therefore, shifts from the known course of building up dibenzanthrone and the benzanthrone couples with the aniline, or whatever base may be used, to form new benzanthrone derivatives which heretofore have not been described.

Inasmuch as it is generally claimed that the 2- and Bz-1- positions of the benzanthrone molecule are the positions which tend to enter into reaction either with themselves or with another compound capable of forming constituents, it may be assumed that a base, such as aniline, when reacting with benzanthrone will enter into the 2- or Bz-1- positions as:

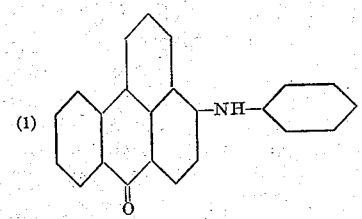

or

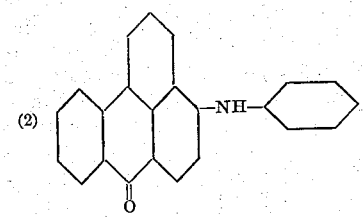

These compounds would not exist except as transitory compounds under the conditions by which they are formed and readily pass to more stable forms, such as:

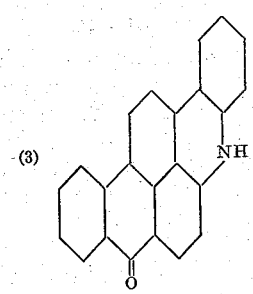

or

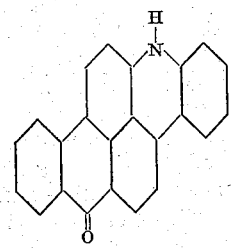

which would be benzanthrone-acridines. Theoretically the aniline might react in a number of other manners, but the formulæ Nos. 3 and 4 above seem by far the most likely.

The synthesis of heterocyclic benzanthrone derivatives containing nuclear nitrogen in a single operation could not be predicted from our previous knowledge of the chemical deportment of the benzanthrone molecule.

It will readily occur to anyone skilled in the art that certain modifications may be made in procedures illustrated by the examples given above without departing from the spirit of my invention. For example, in the preparation of the intermediates exemplified by Examples 1 and 2, the aniline used in said examples may be replaced by any of its homologues, such as the various toluidines, the various xylidines, etc. Any aromatic base, and specifically any aromatic amine, may be employed in lieu of the aniline. Solvents other than those described in the said examples may be employed in the purification of the resulting product. Thus toluene, xylene or mono- and di-chlorbenzene may be used to dilute the reaction mass; the reaction products may also be isolated by steam distillation. Where nitrobenzene has been used in the said examples it is possible to substitute therefor homologous nitro compounds, such as nitrotoluene, dinitrotoluene and nitro-chlorbenzene.

My invention results in a new type of reaction by which a new group of benzanthrone derivatives are formed. The new nitrogen containing compounds are useful as intermediates and when in the water-soluble condition are useful in dyeing leather, wool and silk and other fibrous materials, and in printing on wool and silk.

Since many embodiments of this invention differing widely in one or more respects may be made without departing from the spirit of my invention, it is to be understood that I do not limit myself to the foregoing examples or description except as indicated in the following claims:

I claim:

1. The method of making benzanthrone derivatives containing nuclear nitrogen which comprises heating a mixture of benzanthrone, aniline, caustic potash and nitrobenzene at temperatures about 95–100° C. until an exothermic reaction occurs, cooling, filtering and hydrolizing the resulting product and then purifying said product.

2. The method of making benzanthrone derivatives containing nuclear nitrogen, which comprises heating benzanthrone and aniline in the presence of caustic potash and nitrobenzene.

3. The method of making benzanthrone derivatives containing nuclear nitrogen which comprises heating benzanthrone and a primary aromatic amine of the benzene series in the presence of a caustic alkali and nitrobenzene.

4. The benzanthrone-acridine which may be produced by the method described in claim 2.

5. The benzanthrone-acridine which may be produced by the method described in claim 3.

6. A benzanthrone-acridine.

7. A new compound 2-Bz-1-benzanthrone-hydro-acridine having the probable formula:

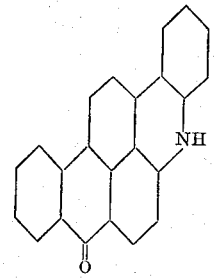

8. A water soluble salt made by dissolving a benzanthrone-acridine in sulphuric acid.

9. A water soluble salt made by dissolving 2-Bz-1-benzanthrone-hydro-acridine in sulphuric acid.

10. A water soluble salt made by dissolving a benzanthrone acridine produced in accordance with the method of claim 3 in sulphuric acid.

11. A benzanthrone methyl acridine.

In testimony whereof, I affix my signature.

ALEXANDER J. WUERTZ.